April 28, 1959 W. E. SWIFT, JR 2,884,539
MULTIPLE SOURCE RADIO-ACTIVE DEVICE
Filed Jan. 26, 1956 3 Sheets-Sheet 1
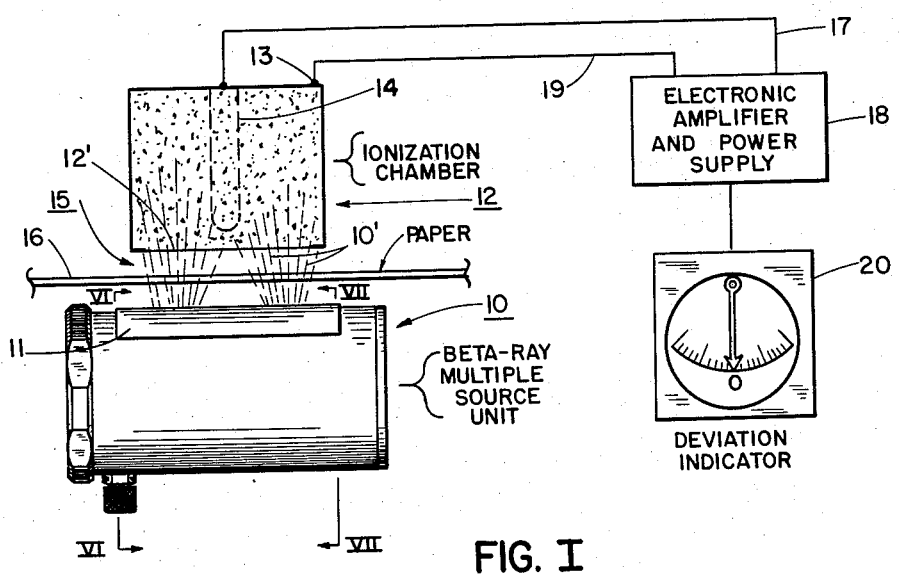
FIG. I
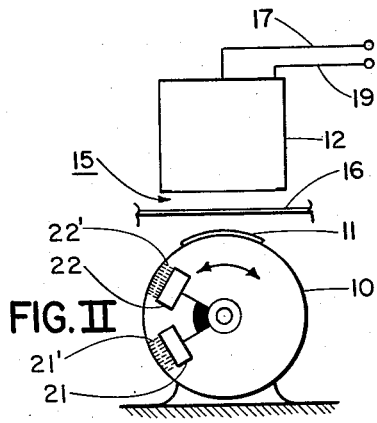
FIG. II
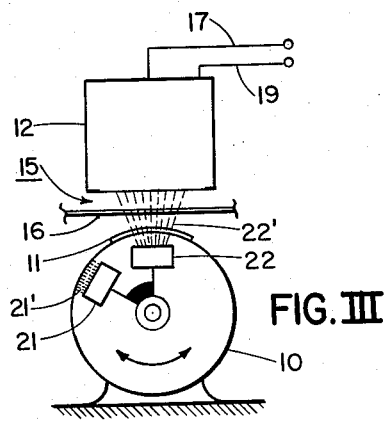
FIG. III
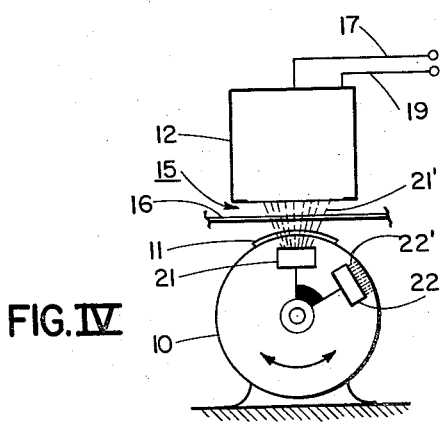
FIG. IV
INVENTOR.
WILLARD EVERETT SWIFT, JR.
BY
Lawrence H. Porter
AGENT April 28, 1959 W. E. SWIFT, JR 2,884,539
MULTIPLE SOURCE RADIO-ACTIVE DEVICE
Filed Jan. 26, 1956 3 Sheets-Sheet 2
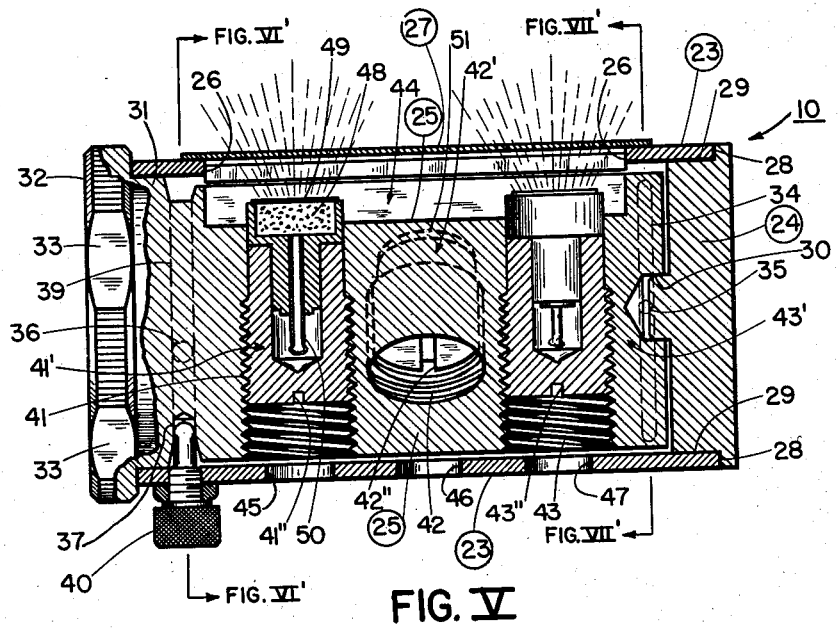
FIG. V
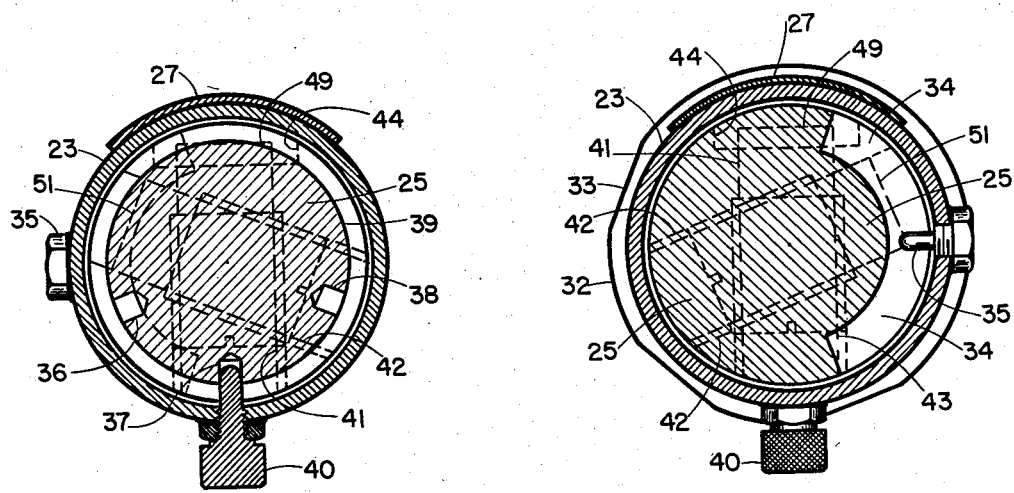
FIG. VI
FIG. VII
INVENTOR.
WILLARD EVERETT SWIFT, JR.
BY
Lawrence H. Porter
AGENT April 28, 1959 W. E. SWIFT, JR 2,884,539
MULTIPLE SOURCE RADIO-ACTIVE DEVICE
Filed Jan. 26, 1956 3 Sheets-Sheet 3
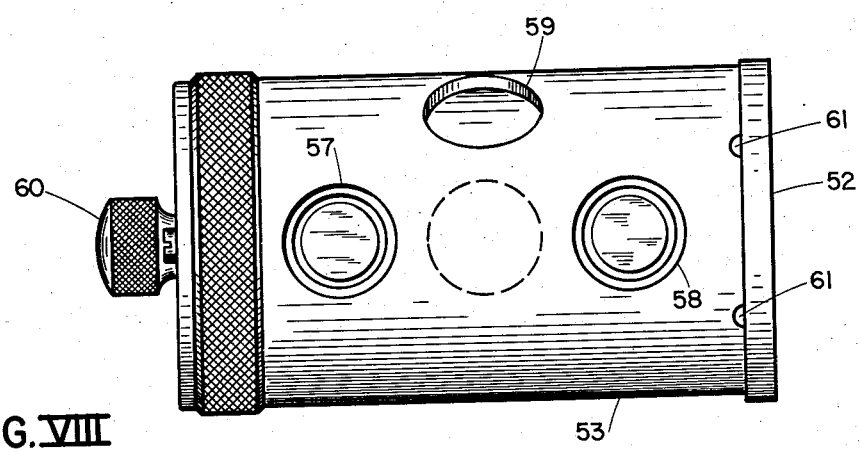
FIG. VIII
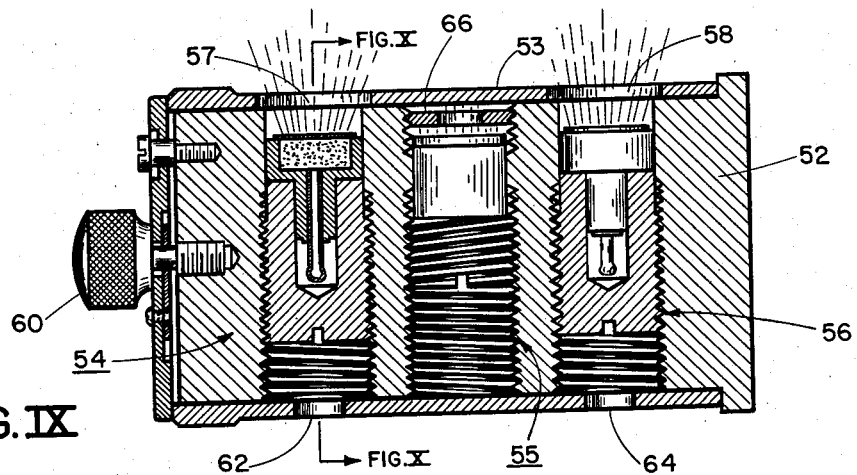
FIG. IX
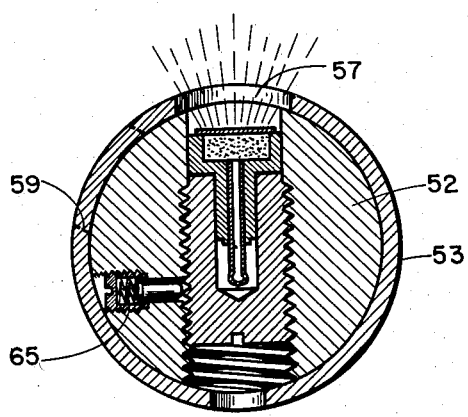
FIG. X
INVENTOR.
WILLARD EVERETT SWIFT, JR.
BY
Lawrence H. Patton
AGENT

United States Patent Office 2,884,539
Patented Apr. 28, 1959

2,884,539

MULTIPLE SOURCE RADIO-ACTIVE DEVICE

Willard Everett Swift, Jr., Sharon, Mass., assignor to The Foxboro Company, Foxboro, Mass., a corporation of Massachusetts Application January 26, 1956, Serial No. 561,521

13 Claims. (Cl. 250—83.6)

This invention relates to gauging systems using a radiation source of the radio-active isotope class, and has particular reference to a multiple source device for such a system.

Various materials, paper for example, may be gauged as to unit weight by passing radiations from a radio-active source through a suitable gap, usually an air gap, to an ionization chamber, with the material under test being placed in the air gap so that some of the radiation is absorbed thereby. The chamber is polarized and contains air or other suitable gas, for example, argon or a mixture of argon and nitrogen. The gas in the chamber is ionized by the radiations which pass through the material under test and enter the chamber. Thus the ionization of the chamber, and consequently the electrical current through the chamber polarization arrangement, are functions of the radiation absorption factor of the material under test.

As an illustration, various beta ray emitting sources may be used, such as thallium 204, strontium 90, krypton 85, or other ionizing radiation source materials. Different materials under test and different conditions of test require different degrees of radiation strength, and the source is chosen accordingly. That is, thallium 204 and krypton 85 provide relatively weak emission for testing thin materials or materials with weak absorption characteristics, whereas strontium 90 provides relatively strong emission for testing thick materials or materials with strong absorption characteristics.

It is often desirable to change the conditions of test, for example, to change the materials under test. Such changes often require a change in the radiation source as well, to provide suitable radiation strength for the material under test. In order to accomplish such source changes with speed, convenience, accuracy and safety, the present invention provides a new and useful source device. This device of the present invention provides means for quick change from one source to another, or to shut-off; provides means for source adjustment while in operating position; and allows for the use of any of a variety of replaceable source units.

It is accordingly, an object of this invention to provide an improved radio-active ionizing radiation source device.

It is a further object of this invention to provide a multiple source radio-active device.

Other objects and advantages of this invention will be in part apparent and in part pointed out hereinafter.

In the drawings:

Figure I is a schematic illustration of a gauging system embodying this invention;

Figure II is a skelton schematic showing of a multiple source according to this invention, with all sources in position of shut-off, i.e., shielded, and with all sources indicated as rotatably adjustable as a unit;

Figure III is an illustration like that of Figure II, with the sources so adjusted that one source is shielded and another source is in operating position;

Figure IV is another illustration like that of Figures II and III, with the sources in a new position of adjustment such that the shielded source of Figure III is now in operative position and the operative position source of Figure III is now shielded;

Figure V is a sectional view of the source unit of Figure I, for the most part in central longitudinal section parallel to the plane of Figure I;

Figure VI is a sectional view of the source unit of Figure I, taken on line VI—VI of Figure I and located in Figure V by line VI'—VI';

Figure VII is another sectional view of the source of Figure I, taken on line VII—VII of Figure I and located in Figure V by line VII'—VII';

Figure VIII is a plan view of an alternate structure of this invention;

Figure IX is a central section showing of the alternate structure of Figure VIII; and Figure X is an end view of the Figure VIII structure, located as at X—X in Figure IX.

In the illustrative embodiment gauging system of Figure I a beta ray multiple source unit 10 is provided, with a beta ray "window" 11 on the upper face thereof. Adjacent the multiple source unit 10, and facing the window 11 thereof, an air filled ionization chamber 12 is provided, suitably polarized through a voltage supply electrode 13 and a collector electrode 14. The ionization chamber 12 has a beta ray permeable window 12' therein and is spaced from the source unit 10 to provide an air gap 15, and a sheet of paper 16 is located in the air gap 15 as the material under test. As beta rays 10' pass through the paper 16 and into the polarized ionization chamber 12, the air in the chamber is ionized so that an electric current flows between the chamber electrodes 13 and 14 to a degree representative of the degree of beta ray passage through the paper 16 and into the chamber 12 and reflecting the degree of absorption of the radiation by the paper. Thus a measure of a variable condition of the paper is provided. This condition is usually the basis weight, that is, total mass per unit area including moisture content.

The electrical current output of the ionization chamber 12, from the collector electrode 14, is carried by an electrical lead 17 to an electronic amplifier 18, which is shown in combination with a voltage source for the ionization chamber, as connected thereto by an electrical lead 19. The electrical output of the amplifier 18 is applied to a deviation indicator 20 which operates to indicate variable condition changes in the paper 16 plus or minus with respect to a predetermined and preset normal, or zero, condition.

Figures II through IV indicate the positions of adjustment of a pair of beta ray sources 21 and 22, shown as being located in the Figure I source unit 10, and rotatably adjustable together therein with respect to alignment and disalignment with the beta ray window 11. For purposes of illustration, and as indicative of one form of a structure according to this invention, Figures II through IV show only two beta ray sources, while Figures I and V indicate three sources, wherein two, which are essentially the same, are aligned with the beta ray window 11 (Figure I) and 27 (Figure V) simultaneously, thus providing substantially the effect of a single elongated source, and the third, which is different in radiation strength from the others, is aligned with the window only when the others are not aligned. The two aligned sources may both be emitters of weak radiation or both emitters of strong radiation.

Figure II thus indicates two beta ray sources 21 and 22 in shut-off position, with their beta rays 21' and 22' blocked off by the shielding action of the housing of the multiple source unit 10. In Figure III rotary adjustment has been made to bring the beta ray source 22 into operative position in alignment with the window 11, while the source 21, although moved with the source 22, is still shielded by the housing of the multiple source unit 10. The Figure IV showing illustrates a further position of rotary adjustment of the beta ray sources 21 and 22. In Figure IV the source 21 is in operative position in alignment with the window 11, and the source 22 is again shielded, since it has been rotatably adjusted past the window 11. Thus either or both of the sources may be adjusted to operative position, and either or both of the sources may be adjusted to shut-off, shielded position.

Figures V—VII inclusive show details of the structure of the Figure I multiple source unit 10, including the structure and arrangements provided for the source adjustments schematically shown in Figures II—IV inclusive.

As in Figure V, the multiple source unit 10 comprises a cylindrical housing 23, an end plug 24 in this housing at the right of the drawing, and a generally cylindrical main body 25 which is mounted for rotation within the cylindrical housing 23 on the longitudinal axis thereof. The housing 23 is formed of a material which is essentially opaque to the radiations being used, such as brass for beta rays, to a thickness suitable for the desired opacity. The housing 23, further, has a generally rectangular cylinder wall section 26 cut out along the top of the housing as viewed in the drawings. This wall section is cut out to allow passage of radioactive source radiations outward from inside the housing, and a thin sheet of metal 27, called a window, is fixed on the housing 23 in covering and sealing relation to the housing wall opening 26. The window 27 primarily is substantially permeable to the radiations being used. As a rough indication, it may be termed at least translucent to such radiations. Further, the window 27 is sufficiently strong to provide a fair measure of protection for the radiation sources against physical impact. The window sealing arrangement protects the multiple source unit as well as the radioactive sources therein against dust and other foreign matter. The window 27, in a beta ray source device for example, is preferably made of stainless steel sheeting of the order of .001 of an inch in thickness.

Continuing with Figure V, at the right of the drawing, the end plug 24 has an annular shoulder 28 which seats the right end of the cylinder housing 23. The plug 24 extends inwardly of the housing in the form of a central bearing boss 30. The right hand end of the cylindrical main body 25 is mounted on the boss 30 as a bearing support for rotational adjustment of the main body 25 about the longitudinal axis of the main body 25. The body 25 has a radial clearance with respect to the housing 23 sufficient to allow easy rotation of the body 25 within the housing. At the left end of the body 25 however, an enlarged diameter portion 31 engages the inner wall of the housing 23 as the left end bearing support of the body 25. A further left end enlarged diameter portion 32 lies outside of the housing 23 and seats on the end thereof, with peripheral flats 33 provided as finger holds for the purpose of rotating the body 25 within the housing 23.

With reference to Figures V and VII, the cylindrical main body 25 is both held endwise within the housing 23 and provided with a limited arcuate span of rotation adjustment by the combination, at the Figure V right end of the unit, of a peripheral slot 34 in the body 25, and a cooperating pin 35 mounted in the housing 23 and extending into the slot 34. The slot and pin arrangement 34, 35 is calculated to provide each of the radio-active sources with only two possible positions: a shielded position, and a position of operative alignment with the window 27.

With reference to Figure V and VI, the cylindrical main body 25 is adjustable in rotation, within the rotation span of the slot and pin arrangement 34, 35, to three different positions, as illustrated by Figures II, III, and IV. At the left of Figure V and in Figure VI three locating holes 36, 37, and 38 are shown as provided in the rotatable body 25, extending radially inward from the bottom of a peripheral slot 39 in the body 25. A readily removable screw 40 is mounted in the housing 23 and has its inner end in the form of a pin which is extended into one of the locating holes 36, 37, 38, according to the desired position of rotation of the body 25.

As a means of mounting the radio-active sources in the multiple unit, the rotatable body 25 is provided with three transverse, cylindrical, threaded openings 41, 42, and 43. These openings extend completely through the rotatable body 25, with the axis of rotation of the body 25 intersecting the longitudinal axis of each of the openings 41, 42, and 43. The longitudinal axes of the two end openings 41 and 43 are on the same diameter line of the body 25, and the longitudinal axis of the central opening 42 is on a diameter about 30 degrees counter-clockwise (Figure VI) from the diameter line of the openings 41 and 43. Thus in this specific, illustrative embodiment of this invention there is provision for three radio-active sources, two of which operate together to effectively form an elongated single source, and the other of which operates as a single essentially spot source.

All of the openings 41, 42, and 43 are contained within the lengthwise span of the Figure V housing opening 26, that is, they are all alignable with the window 27. In each of these openings a radioactive source assembly is threadedly mounted, as at 41', 42', and 43' respectively. To aid in the semblance of a single elongated source comprising the source assemblies 41' and 43', the rotatable body 25 is cut away around and between them at one end of the openings 41 and 43, as at 44. Each of the source assemblies is radially inset with respect to the main outer face of the rotatable body 25 to avoid any possibility of damaging the sources by engaging the inner wall of the housing 23 as the body 25 is rotated in adjustment.

As a further feature of this device, the housing 23, at points diametrically opposite the window 27, is provided with adjustment openings 45, 46, and 47, through which the radio-active source assemblies may be adjusted lengthwise of their respective openings 41, 42, and 43. Thus the effect of each source on the ionization chamber of Figure I may be adjustably varied while the device is in operation. Screw driver slots 41'', 42'', and 43'' are provided at the lower end of each source assembly, for this purpose. It should be noted that such adjustment can be made only when the source assembly involved is in operative alignment with the window 27, and that the arrangement of the span slot 34, Figure VII is such as to prevent any of the sources from being operatively aligned with the adjustment openings 45, 46, and 47. Thus the source radiations cannot be directed through these adjustment openings.

As previously mentioned herein, various radio-active source materials may be used as desired, and in various combinations for particular applications. In the specific embodiment shown in Figure V by way of illustration, source assemblies 41' and 43' are provided with krypton 85 as gas sources, and the source assembly 42' is provided with strontium 90 as a solid source. In each case the radio active source is mounted on a threaded support to form that particular source assembly, i.e., 41', 42', or 43', In the case of the gas source assembly 41' a chamber 48 is provided, with a radiation permeable window 49 thereon. Gas is orginally supplied to the chamber 48 through a pipe 50, which is then sealed off. Source assembly 43' is identical with source assembly 41'. In the case of the solid source assembly 42' a layer 51 of solid material charged with radio-active strontium 90 is placed on a disc and the disc is mounted on a threaded support to form the assembly 42'.

With reference to Figure V, it is readily within the scope of this invention to hold the main body 25 stationary, and rotate the housing 23 thereabout to achieve the desired selective presentations of the sources to the window.

Figures VIII–X illustrate an alternate structure wherein the multiple source has a fixed main body 52 and a shielding sleeve housing 53 rotatable with respect thereto to selectively bring a series of source assemblies 54, 55, 56, into operative relation with an ionization chamber (not shown) such as that illustrated in Figure I (12).

In this structure the main body 52 is provided with the same krypton and strontium source assemblies (54, 55, 56) as are shown in Figure I except that the Figure VIII–X sources are all radially aligned with each other. In this alternate structure the shield sleeve 53 is provided with two aligned windows 57, 58 for the sources 54, 56, and with one off-angle window 59 for the source 55. The sleeve 53 and body 52 are held together by a bolt 60 and located by detent arrangements 61. To shift the sources, the bolt 60 is loosened and the sleeve 53 is turned. The source assemblies 54, 55, and 56 are adjustable in place through adjustment openings such as shown at 62, and 64. In this device a nylon composition plug 65 is inserted laterally in the main body 52 to bear on each of the source assemblies 54, 55, 56 to hold these assemblies in their adjusted positions. Further, with respect to the strontium assembly 55, a partial masking donut plug 66 may be used, if desired, to cut down the strong strontium radiation to a relatively weaker effective radiation.

This invention, therefore, provides a new and improved radio-active source device, and in particular provides a multiple source radio-active device.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. For a gauging system wherein radiations from a radio-active source device are passed through a body under test and thereafter applied to a single ionization chamber to vary the ionization thereof as an indication of the changes in a variant in said body under test, a multiple source radio-active device mounted in operative relation to said chamber and comprising an assembly of at least two different radio-active gauging sources, and means for adjusting said device with respect to said chamber to selectively bring said sources into operative alignment with said single ionization chamber.

2. A multiple source radio-active device for use in a gauging system, comprising a housing as a radio-active radiation shield, a radio-active radiation permeable window arrangement in said housing, a plurality of radio-active sources, wherein at least two are different in and relatively movable with respect to said housing, and means for selectively aligning each of said sources with said window.

3. For use in a gauging system wherein radiations from a radio-active source device are passed through a body under test and thereafter applied to an ionization chamber to vary the ionization thereof as an indication of the changes in a variant in said body under test, a multiple source radio-active device comprising a housing as a radio-active radiation shield, a radio-active radiation permeable window arrangement in said housing and facing said ionization chamber, an assembly of radio-active gauging sources, wherein at least two are different, mounted within said housing, and means for relatively adjusting said housing and said assembly to selectively bring each of said sources into operative alignment with said ionization chamber by way of said window arrangement.

4. A multiple source radio-active device for use in a gauging system, comprising a housing as a radio-active radiation shield, a radio-active radiation permeable window in said housing, a support body mounted within said housing for such relative movement with respect to said housing as to selectively present different portions of said body to said window, a plurality of radio-active source units mounted on said support body for selective presentation of each to said window according to said relative movement and means for producing said relative movement to accomplish said selective presentation of said source units.

5. A radio-active gauging source device comprising a housing as a radio-active radiation shield, a radio-active radiation permeable window in said housing, an elongated body mounted within said housing and rotatable about a lengthwise axis thereof, a plurality of radio-active source units transversely mounted in said body with a substantial angle of rotation between at least two of said units, and means for rotating said body in such manner as to selectively present each of said source units to said window.

6. A radio-active gauging source device comprising a rotatable housing as a radio-active shield, a body mounted within said housing, a plurality of radio-active source units transversely mounted in said body, windows in said housing with reference to said source units and located so as to be aligned with less than all of said sources at once, and means for rotating said housing about said body in such manner as to selectively present each of said source units to their respective ones of said windows.

7. A radio-active gauging source device comprising a housing as a radio-active shield, a radio-active radiation permeable window in said housing, an elongated body mounted within said housing and rotatable about a lengthwise axis thereof, a plurality of radio-active source units transversely mounted in said body with a substantial angle of rotation between at least two of said units, means for rotating said body in such manner as to selectively present each of said source units to said window, and pin and detent hole arrangements between said housing and said body for alignment and location therebetween with respect to said selective presentations.

8. A multiple source radio-active gauging device comprising a housing as a radio-active radiation shield, a radio-active radiation permeable window in said housing, an elongated body mounted within said housing and rotatable about a lengthwise axis thereof, three radio-active source units transversely mounted in said body with two of said source units having essentially the same radio-active characteristics and the other having substantially different radio-active characteristics, said two of said units being in mutual radial alignment and said one of said units being at a substantial rotary angle with respect to said two of said units, whereby said two of said units approximate a single elongated source, and means for rotating said body in such manner as to selectively present each of said source units to said window.

9. A multiple source radio-active gauging device comprising a cylindrical housing as a radio-active radiation shield, a radio-active radiation permeable window in said housing, a cylindrical body mounted within said housing and rotatable about the longitudinal axis of said housing, a plurality of radio-active source units transversely mounted in said body with a substantial angle of rotation between at least two of said units, means for rotating said body in such manner as to selectively present each of said source units to said window, pin and detent hole arrangements between said housing and said body for alignment and location therebetween with respect to said selective presentations, and a pin and arcuate slot arrangement between said housing and said body to limit the rotation of said body to an arc sufficient to encompass said selective presentations.

10. A radio-active gauging source device comprising a cylindrical housing as a radio-active radiation shield, a radio-active radiation permeable window in said housing, a cylindrical body mounted within said housing and rotatable about the longitudinal axis of said housing, a plurality of radio-active source units transversely mounted in said body with a substantial angle of rotation between at least two of said units, means for rotating said body in such manner as to selectively present each of said source units to said window and means for adjusting said units transversely of said body and while said device is in operation.

11. A radio-active gauging source device comprising a cylindrical housing as a radio-active radiation shield, a radio-active radiation permeable window in said housing, a cylindrical body mounted within said housing and rotatable about the longitudinal axis of said housing, a plurality of radio-active source units transversely mounted in said body with a substantial angle of rotation between at least two of said units, means for rotating said body in such manner as to selectively present each of said source units to said window, means for adjusting said units transversely of said body and while said device is in operation, said adjustment means including openings in said housing opposite said window, and a pin and arcuate slot arrangement between said housing and said body to limit the rotation of said body to an arc sufficient to encompass said selective presentations and insufficient to present any of said sources to any of said adjustment openings.

12. A radio-active gauging source device comprising a cylindrical housing as a radio-active radiation shield, a radio-active radiation permeable window in said housing, a cylindrical body mounted within said housing and rotatable about the longitudinal axis of said housing, three radio-active source units transversely mounted in said body with two of said source units having essentially the same radio-active characteristics and the other having a substantially different radio-active characteristic, said two of said units being in mutual radial alignment with said one of said units being at a substantial rotary angle with respect to said two of said units, whereby said two of said units approximate a single elongated source, means for rotating said body in such manner as to selectively present each of said source units to said window, pin and detent hole arrangements between said housing and said body for alignment and location therebetween with respect to said selective presentations, means for adjusting said units transversely of said body and while said device is in operation, said adjustment means including openings in said housing opposite said window, and a pin and arcuate slot arrangement between said housing and said body to limit the rotation of said body to an arc sufficient to encompass said selective presentations and insufficient to present any of said sources to any of said adjustment openings.

13. A radio-active gauging source device comprising a cylindrical housing as a rotatable radio-active radiation shield, three radio-active radiation permeable windows in said housing, two of said windows being in mutual radial alignment with respect to said housing and the third of said windows being at a substantial rotary angle with respect to said two of said windows, a fixed cylindrical body mounted within said housing, three radio-active source units for respective alignment with said windows and transversely mounted in said body with two of said source units having essentially the same radio-active characteristics and the other having a substantially different radio-active characteristic, said units being in mutual radial alignment, whereby said two of said units approximate a single elongated source, means for rotating said housing in such manner as to selectively present each of said windows to said source units, detent arrangements between said housing and said body for alignment and location therebetween with respect to said selective presentations, and means for adjusting said units transversely of said body and while said device is in operation, said adjustment means including openings in said housing opposite said windows.

References Cited in the file of this patent

UNITED STATES PATENTS

| | | |
|---|---|---|
| 2,490,298 | Ghiorso et al. | Dec. 6, 1949 |
| 2,499,889 | Teichmann | Mar. 7, 1950 |
| 2,675,479 | Stewart et al. | Apr. 13, 1954 |